United States Patent [19]

Wada et al.

[11] Patent Number: 4,500,889
[45] Date of Patent: Feb. 19, 1985

[54] METHOD FOR RECORDING LIGHT INFORMATION

[75] Inventors: Minoru Wada; Yonosuke Takahashi; Eiichi Hasegawa, all of Saitama, Japan

[73] Assignee: Fuji Photo Film Co., Ltd., Kanagawa, Japan

[21] Appl. No.: 390,735

[22] Filed: Jun. 21, 1982

[30] Foreign Application Priority Data

Jun. 19, 1981 [JP] Japan .................................. 56-93964

[51] Int. Cl.³ ...................... G01D 15/34; G01D 15/32; G03C 5/04; G03C 5/24
[52] U.S. Cl. .................................. 346/1.1; 346/76 L; 346/135.1; 430/348; 430/945
[58] Field of Search .................... 346/135.1, 1.1, 76 L; 430/945, 348

[56] References Cited

U.S. PATENT DOCUMENTS

| | | | |
|---|---|---|---|
| 4,309,713 | 1/1982 | Shinozani et al. | 346/135.1 |
| 4,335,198 | 6/1982 | Hanada et al. | 346/135.1 |
| 4,357,616 | 11/1982 | Terao et al. | 346/135.1 |
| 4,370,391 | 1/1983 | Mori et al. | 346/135.1 |
| 4,415,650 | 11/1983 | Kido et al. | 430/273 |

Primary Examiner—E. A. Goldberg
Assistant Examiner—Gerald E. Preston
Attorney, Agent, or Firm—Sughrue, Mion, Zinn, Macpeak and Seas

[57] ABSTRACT

In a method for recording information by irradiating an optical information recording material comprising a heat mode recording layer comprising a metal on a base with a light beam, the method for recording optical information in which said heat mode recording layer consists of a metal and at least one metal compound selected from metal oxides and metal sulfides and the proportion of the amount of the metal to that of said metal compound increases or decreases in the direction of the thickness of the layer, said recording layer having a layer comprising of mixture of at least one of the metal and at least one of the metal compound, in which irradiation with the light beam is conducted from the side where the proportion of the metal in the recording layer is smaller, and in which melting and removing are conducted until the difference in reflectance of the light between the non-recorded area and the recorded area reaches an extent which permits reading by light. The method permits highly sensitive recording by a light beam of a lower energy and can afford a record of information suitable for reflex reading.

23 Claims, 6 Drawing Figures

METHOD FOR RECORDING LIGHT INFORMATION

FIELD OF THE INVENTION

The present invention relates to a method for recording optical information. More particularly, this invention relates to a method for recording optical information which comprises recording information suitable for reflex reading by a laser beam.

BACKGROUND OF THE INVENTION

Photosensitive material such as silver salts have been employed as recording materials utilizing a light beam of a high energy density. Thermal recording materials have also been used for the same purposes. In such thermal recording materials, a recording layer has a high optical density. The recording layer absorbs an irradiated light beam of a high energy density causing a local temperature rise. Accordingly the irradiated area will undergo deformation by heat, such as melting-cohesion or evaporation. As a result, the area which has been irradiated by light is removed producing a difference in optical density from the non-irradiated area. Thereby information is recorded (cf. U.S. Pat. Nos. 4,188,214, 4,291,119, 4,216,501, 4,233,626, 4,188,214 and 4,291,119 and British Pat. No. 2,026,346). Such thermal recording materials are generally desirable with respect to processing. Conventional development and fixing are not necessary. Furthermore, since the recording layer is not sensitive to ordinary indoor light, operations in a darkroom are not required. In addition an image having a high contrast can be obtained, and it is possible to add more information (i.e. add-on).

In general, the method for recording on such thermal recording materials is often achieved by converting the information to be recorded into an electrical time sequence signal, and then scanning with a laser beam. The intensity of the laser beam has been modulated with respect to a signal, on the recording material. This is desirable because a recorded image can be obtained in actual time, i.e. instantaneously.

Suitable examples of the recording layer for such thermal recording materials are metals, dyestuffs and plastics. In general, an inexpensive material is used. Such recording materials are described in, for example, M. L. Levene et al, "Electron, Ion and Laser Beam Technology", the paper submitted to the 11th Symposium (1969), Electronics (Mar. 18, 1968), p. 50; D. Maydan, "The Bell System Technical Journal", Vol. 50 (1971), p. 1761; C. O. Carlson, "Science", Vol. 154 (1966), p. 1550 etc. Among the above, examples in which a metal is employed in the recording layer are those in which a thin film of a metal such as Bi, Sn, In etc. is used on a base. These metals have excellent properties as thermal recording materials, since an image of a high resolving power can be recorded. More specifically, can be used to obtain a high contrast image.

However, in general, recording materials utilizing metal thin films are not desirable because most of them have a light reflectance of 50% or higher with respect to laser light employed for recording. Therefore, the energy of the laser light can not be efficiently utilized. Since a large amount of light energy is necessary for recording a laser source of a great output is necessary for recording by high-speed scanning. As a result, a large expensive recording apparatus is inevitably required. In view of these circumstances recording materials having high recording sensitivity have been investigated. For instance, recording materials comprised of three layers of Se, Bi and Ge are described in Japanese patent publication No. 40479/1971. In that patent publication, the Se layer is provided for reducing the reflectance by the Bi layer for the irradiated light. The Se layer is an easily evaporable layer, so that both of them promote thermal deformation of the Bi layer, the main layer, by a small amount of energy as compared with the case of the Bi layer alone. The layers for reducing or preventing reflectance are also described in Japanese patent application (OPI) 151151/1975, (the term "OPI" as used herein refers to a "Published unexamined Japanese patent application") and Japanese patent publication No. 14262/1976. In addition, materials where a layer for reducing thermal conductivity is provided between a recording layer and its support are disclosed in Japanese patent application (OPI) No. 126237/1976 and Japanese patent application (OPI) No. 16026/1976. Still further, Japanese patent application (OPI) No. 78236/1976 (corresponding to U.S. Pat. Nos. 4,188,214 and 4,291,119) and Japanese patent application (OPI) No. 20821/1977 describe recording layers in which a metal sulfide, metal fluoride or metal oxide is overlaid with or mixed with a metal.

Information is recorded on the recording materials described above by irradiating with a beam of high energy density, such as a laser beam. This causes thermal deformation of the recording layer, completely removing the entire irradiated area of the recording layer. Therefore, in such a recording mode, it is essential that the energy of the laser beam be high enough to remove the entire irradiated area of the recording layer. For this reason, a laser light of considerably high energy is still required even when using a means such as the above-described sensitization. Reading of the record thus obtained is conducted by transmitted light, because if reading is made by the reflected light, only a small range of lights (determined by the composition of the recording layer) can be employed. Furthermore, the incident angle to the recording layer is also restricted to an extremely narrow range.

SUMMARY OF THE INVENTION

Accordingly, an object of this invention is to provide a method for recording optical information which permits highly sensitive recording by a light beam of a lower energy and can afford a record of information suitable for reflex reading by employing a recording material comprising a heat mode recording layer composed of a metal on a base.

Another object of this invention is to provide a method for recording optical information which permits recording of information which is free from restriction on the wavelength of light used on reading, by employing the above-described materials.

The present invention resides in a method for recording information by irradiating an optical information recording material comprising a heat mode recording layer comprising a metal on a base with a light beam. The heat mode recording layer comprises a metal and at least one metal compound selected from metal oxides and metal sulfides. The proportion of the amount of the metal to that of said metal compound changes in a manner wherein the proportion either increases or decreases in the direction of the thickness of the layer. The recording layer contains at least one layer comprising of a mixture of at least one of the metals and at least one of the metal compounds. Irradiation with the light beam is conducted from the side where the proportion of the metal in the recording layer is smaller, and in which melting and removing are conducted until the difference in reflectance of light used for reading between the non-irradiated area and the irradiated area reaches an extent which is sufficient to permit reading by light.

DETAILED DESCRIPTION OF THE INVENTION

In the recording layer of the present invention, the proportion of the metal to the metal compound changes in the direction of the layer thickness. The proportion may change continuously, discontinuously so as to form at least two layers of different compositions or continuously changes for a part of the thickness and discontinuously changes for the rest of the thickness.

The base for the recording material employed in this invention may be a conventional support used for ordinary recording materials, such as a film or a plate of a plastic, e.g. polyethylene terephthalate, polycarbonate, acrylic resin etc., a glass plate, a wood plate, a paper sheet, or a metal in the form of a plate or foil. In this invention, irradiation with the laser beam is conducted from the side where the proportion of the metal in the recording layer is smaller. However, when the proportion of the metal is greater on the top surface side, irradiation by the laser beam is conducted from the support side, and in such a case, it is essential that the base be made of a transparent material, such as glass, a transparent plastic or the like.

Examples of the metal for the recording layer used in this invention include Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se etc., and these metals may be employed either alone or as a combination or an alloy of two or more of these metals. In this invention, the metal is distributed together with at least one metal compound hereinbelow described at a compositional ratio changing in the direction of the thickness of the recording layer. The area where the proportion of the metal compound is greater is melted and removed, whereas the metal area or area where the proportion of the metal is greater (the proportion of metal compound is small) is left intact. Accordingly, it is more desirable to use a metal having a higher melting point. In view of factors such as low toxicity, easiness of the production of films, etc., the use of Al is particularly preferred.

The metal compound or compounds are selected from metal sulfides and metal oxides. Preferred examples of the metal sulfides employed in this invention include CrS, $Cr_2S$, $Cr_2S_3$, $MoS_2$, MnS, FeS, $FeS_2$, CoS, $Co_2S_3$, NiS, $Ni_2S_3$, PdS, $Cu_2S$, $Ag_2S$, ZnS, $In_2S_3$, $In_2S_2$, $GeS_x$ ($1 \leq X \leq 2$), SnS, $SnS_2$, PbS, $As_2S_3$, $Sb_2S_3$, $Bi_2S_3$ etc., and suitable examples of the metal oxides include $MoO_2$, InO, $In_2O$, $In_2O_3$, GeO, PbO, $WO_3$, $TiO_2$, SiO, $SiO_2$, $ZrO_2$, $Al_2O_3$ etc.

Figure 1:
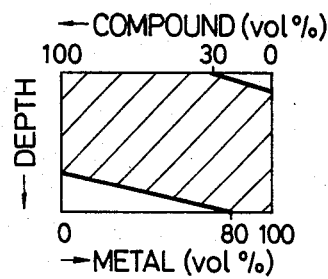
FIG. 1 to FIG. 6 are graph diagrams showing examples of the volume fractions (expressed as percentages) of the metal and the metal compound or compounds in the direction of the thickness (or depth) of the recording layer.
Figure 5:
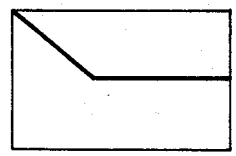
Figure 2:
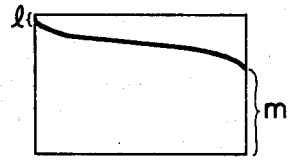
Figure 6:
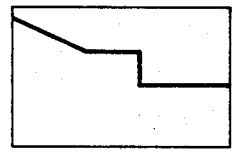

Some examples of the change in proportion of the metal to at least one metal compound selected from metal oxides and metal sulfides in the direction of the thickness of the recording layer are shown in FIG. 1 to FIG. 6. In all figures, vertical axes show the depth of the recording layer and the horizontal axes show the percentage of amount of the metal compound and the amount of the metal as shown in FIG. 1. The depth is measured from the surface of the recording layer (in the direction of the thickness) on which irradiation is conducted when recording, that is, the surface on which the proportion of the metal compound is greater. In the recording materials of this invention, with the increase in depth of the recording layer, the proportion of the metal increases and that of the metal compound decreases accordingly. The proportion of these both generally falls into the range indicated by the hatched area in FIG. 1. This range varies depending on the material used, but in general, at the surface which is irradiated, the metal compound preferably comprises at least about 30 volume % and more preferably at least about 35 vol %, and the proportion of the metal compound increases with the increase in depth. On the surface, opposite to the side to be irradiated, where the proportion of the metal is greater, the metal preferably comprises at least 70 vol % and more preferably at least 80 vol %. When the proportion changes as shown in FIG. 2, the vicinity of the surface of the recording layer to be irradiated is preferably composed of the metal compound alone. The thickness of the part composed of the metal compound alone (l in FIG. 2), may vary depending on the material used. However, preferably 0–500 Å and more preferably 10–300 Å. Similarly, as also shown in FIG. 2, in such a recording layer the vicinity of the surface opposite to the side to be irradiated is preferably composed of the metal alone, and its thickness (m in FIG. 2) varies depending on the material used. However, it is preferably 0–900 Å and more preferably 100–700 Å.

Figure 3:
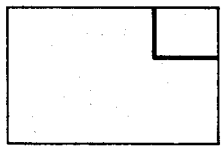
Figure 4:
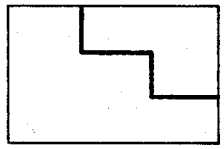

The composition may change continuously as shown in FIG. 2 or discontinuously so as to form two or more, preferably three or more, layers having different compositions and containing at least one layer comprised of a mixture of at least one metal and at least one metal compound, as that shown in FIG. 3 or 4. It is also possible to continuously decrease the proportion of the metal compound for a part of the depth in the direction of the thickness and then use only a metal layer for the rest of the depth (as in FIG. 5); or to then decrease the proportion of the metal compound stepwise, i.e., discontinuously (as in FIG. 6). In each recording layer shown in FIGS. 1–6, either surface may be in contact with a support. However, when the surface on which the proportion of the metal compound is greater is brought into contact with the support, the material used for the support must be transparent to the light used.

The change in proportion of the metal to the metal compound may be freely adjusted. However, after recording, there must be a difference in reflectance between the irradiated (recorded) area formed by melting and removing a part of the recording layer and the non irradiated (non-recorded) area in order to permit reading. Where the respective reflectances are expressed in percent, the difference between them is preferably at least 20% and more preferably at least 25%. Further, since it is desirable that the reflectance of the recorded area is at least 50% and more desirable at least 60%, it is preferred to predetermine the composition of the recording layer so that the reflectance of the area to be exposed by irradiation is at least 50%. On irradiation, the energy of the laser beam given to the recorded area is applied until the area having the composition exhibiting a reflectance approximately enough to permit satisfactory reading is exposed as described above.

The recording material used in this invention may be prepared by providing a recording layer on a base in a conventional manner. In order to produce a continuous compositional distribution of the metal and the metal compound in the recording layer, it is possible to use methods such as vapor deposition or spattering and to change the deposition speeds of the metal and the metal-sulfide and/or the metal oxide. When forming a layer containing the metal oxide and/or the metal sulfide, the constituent metal may be deposited in an atmosphere of oxygen and/or sulfer. Where the recording layer comprises a discontinuous layer, the metal layer, the layer of a mixture of the metal and the metal compound, and the metal compound layer may be formed individually and successively on a base by e.g. deposition, spattering or ion plating.

The film thickness of the recording layer can vary depending on the types of metals and metal compounds used, the intensity of the laser beam etc. However, the thickness generally is 300 Å or more in order to enhance the reflectance of the recording area and generally 2000 Å at most in order to improve the recording sensitivity, 500-1500 A being preferred.

In the recording material used in this invention, it is also possible to provide a protective layer of an inorganic or organic material on the recording layer for the purpose of improving durability, mechanical strength, stability with time etc. Examples of the inorganic material include $Al_2O_3$, $SiO_2$, $SiO$, $MgO$, $ZnO$, $TiO_2$, $ZrO_2$, $MgF_2$ and $CuF_2$. Examples of the organic material include styrenic resins such as polystyrene, styrene-maleic anhydride resin etc., vinyl resins such as polyvinyl acetate, polyvinyl alcohol, polyvinyl butyral, polyvinyl formal etc., methacrylic acid ester resins such as polyisobutyl methacrylate, polymethyl methacrylate etc., amide resins such as polydiacetoneacrylamide, polyacrylamide etc., cellulosic resins such as ethyl cellulose, cellulose acetate lactate, cellulose nitrate, diacetyl cellulose etc., polyhalogenated olefins such as polyvinyl chloride, chlorinated polyethylene etc., phenolic resins, soluble polyester, soluble nylons, gelatin etc., as well as copolymers containing monomers forming the above-described polymers. These may be employed either alone or as a mixture of two or more thereof. These resins may be dissolved in various solvents and coated by known coating methods.

While various solvents may be employed as the solvent, an appropriate one may be chosen from, for example, acetone, methyl ethyl ketone, methyl isobutyl ketone, methyl cellosolve, ethyl cellosolve, butyl cellosolve, methyl cellosolve acetate, ethyl cellosolve acetate, butyl cellosolve acetate, hexane, cyclohexane, ethylene chloride, methylene chloride, benzene, chlorobenzene, methanol, ethanol, butanol, petroleum ether, dimethylformamide, thinner etc., depending on the resin to be used.

Among these resins, some permit further addition of various additives, such as pigments, matting agents, plasticizers, lubricants etc. according to the purpose, and particularly, addition of a higher fatty acid or acid amide of 11 or more carbon atoms in an amount of about 0.1-10% by weight based on the resin imparts slip properties and also enhances the film surface strength of the recording material.

Further, the lubricant such as these higher fatty acids and acid amides may also be coated on the protective layer to a thickness of 0.001-1 μm in a conventional manner. The film thickness of the protective layer used in this invention is chosen to the optimal thickness according to the film surface strength, stability with time, recording sensitivity etc. which are required of the recording material, a thickness of 0.01-500 μm being particularly preferred.

The recording layer used in this invention has a distribution of the compositional ratio of the metal to the above-described metal compound such that (1) the proportion of the metal is greater on the top surface, or (2) the proportion of the metal is smaller on the top surface. In the recording material of the type (1), recording by the light beam and reflex reading are conducted from the base side, while with the recording material of the type (2), recording and reflex reading are conducted from the top surface side.

In this invention, the recording layer of the recording material having the construction described above is irradiated from the side where the proportion of the metal is smaller with a light beam for example, a laser beam or xenon flash having an energy not sufficient to melt and remove the entire recording layer. More specifically the energy does not melt the portion where the proportion of the metal is greater and which is to be exposed as a reflection surface but will melt and remove only the other portion, i.e., the portion where the proportion of the metal compound is greater. This will expose the metal portion or the portion where the proportion of the metal is greater, thereby achieving recording of information. When conducting light beam recording according to this method, since the proportion of the metal is smaller on the surface to be irradiated, the reflectance of light is smaller. Therefore, it is possible to obtain high sensitivity recordings, and at the same time, since only the area where the proportion of the metal compound is greater is to be removed by melting, a light beam of a low energy can be employed.

The information obtained by the method of this invention may be read by e.g. a laser beam. A visible light may also be used for reading when the width of lines or sizes of areas of the recorded area are sufficient to read by naked eyes. The recording layer is irradiated from the same side as that from which recording has been conducted, with a light beam (of a weaker energy than that used on recording), and the information may be read by utilizing the difference in reflection density between the exposed area, i.e., the metal portion or the portion where the proportion of the metal is greater and the non-irradiated area where the proportion of the metal is smaller. On reading, as described above, if the recording layer has at least one layer comprising of a mixture of at least one of metals and at least one of metal compounds, there are less restrictions with respect to the wavelengths of the light which can be used. Therefore, various lights may be used. Furthermore, there are less restrictions on the incident angle of the light which can be used for reading the record on the recording material having such a recording layer. Furthermore, in at least a part of the recording layer, continuous or discontinuous changes in the proportion of the metal to the metal compound reduces the reflectance in the non-recorded area. Therefore, it is preferable for lowering the reflectance to change the proportion continuously, and the greater the gradation, the better. If the change in proportion is discontinuous, it is possible to use a greater number of layers having different compositions to reduce reflectance in the non-recorded area.

The method of this invention may be applied to the preparation of optical discs such as audio discs, memory discs etc., hard copies of various images etc.

EXAMPLE 1

On a polyethylene terephthalate support of a thickness of 100 μm was deposited Al to a thickness of 444 Å ($1.2 \times 10^{-5}$ g/cm$^2$ as a load) followed by vapor deposition of Al-Al$_2$O$_3$ in an atmosphere of oxygen at a pressure of $3.3 \times 10^{-2}$ Pa and at an Al vapor deposition rate of $1.67 \times 10^{-7}$ g/cm$^2$.sec to deposit $1.0 \times 10^{-5}$ g/cm$^2$ as a load calculated as Al, to prepare a recording material comprising a recording layer having a compositional distribution shown in FIG. 3.

A light beam from an Ar ion laser was focused to 25 μm diameter and scanned on the above recording material at a speed of 18.8 m/sec, and the Al metal layer was successfully exposed at an output of 200 mW and a linear width of 10 μm, and thus clear reading using the reflected light was enabled. (the difference of reflectances between the recorded area and the non-recorded area was about 40%).

On the other hand, when recording by melting and removing the entire recording layer at a linear width of 10 μm was conducted in a similar laser recording method, a laser output of 300 mW was needed.

EXAMPLE 2

On a polyethylene terephthalate support of a thickness of 100 μm was deposited Al to a thickness of 444 Å ($1.2 \times 10^{-5}$ g/cm$^2$ as a load) followed by simultaneous deposition of Al and SnS in a volume ratio of 185:98 to a thickness of 283 Å ($5.0 \times 10^{-6}$ g/cm$^2$ each as a load), to prepare a recording material comprising a recording layer shown in FIG. 3.

A light beam from an Ar ion laser was focused to 25 μm in diameter and scanned on the above recording material at a speed of 18.8 m/sec, and at an output of 200 mW and a linear width of 10 μm, the Al metal layer was successfully exposed and thus clear reading using the reflected light was enabled. (The difference of reflectances between the recorded portion and the non-recorded portion was 30%).

On the other hand, when recording by melting and removing the entire recording layer at a linear width of 10 μm was conducted in a similar laser recording method, a laser output of 300 mW was needed.

EXAMPLE 3

On a polyethylene terephthalate support of a thickness of 100 μm was deposited Al and SnS by vacuum deposition so as to have a compositional distribution as shown in FIG. 2. This mixed layer of Al and SnS was prepared by using two kinds of evaporating sources, i.e. one for the metal (Al) and the other for the sulfide (SnS) and controlling the respective temperatures to give the desired evaporating rates, thereby simultaneously depositing them on the support. The thickness of the recording layer was 1200 Å, and l and m in FIG. 2 were 60 Å and 720 Å respectively. The proportion of the metal (Al) to the sulfide (SnS) in the whole recording layer was 5:1 on the volume basis.

A light beam from an Ar ion laser was focused to 25 μm in diameter and scanned on the above recording material at a speed of 18.8 m/sec, and at an output of 175 mW and a linear width of 10 μm. The portion where the proportion of Al was greater was successfully exposed and thus clear reading using the reflected light was enabled. (The difference of reflectances between the recorded portion and the non-recorded portion was 40%).

On the other hand, when recording by melting and removing the entire recording layer at a linear width of 10 μm was conducted in a similar laser recording method, a laser output of 250 mW was needed.

What is claimed is:

1. In a method for recording information by irradiating an optical information recording material comprising a heat mode recording layer comprising a metal on a base with a light beam, the method for recording optical information in which said heat mode recording layer consists of a metal and at least one metal compound selected from metal oxides and metal sulfides and the proportion of the amount of the metal to that of said metal compound changes in a manner that the proportion either increases or decreases in the direction of the thickness of the layer, said recording layer having a layer comprising a mixture of at least one of the metals and at least one of the metal compounds in which irradiation with the light beam is conducted from the side where the proportion of the metal in the recording layer is smaller, and in which melting and removing are conducted to expose an area where the proportion of the metal is greater in the recording layer until the difference in reflection of the light between the non-irradiated area and the irradiated area reaches an extent which is sufficient to permits reading by light.

2. A method for recording information by irradiating an optical information recording material, as claimed in claim 1, wherein the proportional amount of the metal to the metal compound increases in the direction of the thickness of the layer towards the base.

3. A method for recording information by irradiating an optical information recording material, as claimed in claim 1, wherein the proportional amount of the metal to the metal compound decreases in the direction of thickness of the layer in the direction towards the base.

4. A method of recording information by irradiating an optical information recording material, as claimed in claim 1, wherein the proportional amount of the metal to the metal compound changes continuously in the direction of thickness.

5. A method for recording information by irradiating an optical information recording material, as claimed in claim 1, wherein the proportional amount of the metal to the metal compound changes discontinuously so as to form a plurality of different layers of different composition.

6. A method for recording information by irradiating an optical information recording material, as claimed in claim 1, wherein the proportional amount of the metal to the metal compound continuously changes for a part of the thickness and discontinuously changes for the rest of the thickness.

7. The method for recording light information according to claim 1 wherein the metal is selected from Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se and mixtures and alloys thereof.

8. The method for recording optical information according to claim 1 wherein the metal sulfide is selected from CrS, Cr$_2$S, Cr$_2$S$_3$, MoS$_2$, MnS, FeS, FeS$_2$, CoS, Co$_2$S$_3$, NiS, Ni$_2$S$_3$, PdS, Cu$_2$S, Ag$_2$S, ZnS, In$_2$S$_3$, In$_2$S$_2$, $GeS_x$ ($1 \leq X \leq 2$), SnS, $SnS_2$, PbS, $As_2S_3$, $Sb_2S_3$, $Bi_2S_3$ and a mixture thereof.

9. The method for recording optical information according to claim 1 wherein the metal oxide is selected from $MoO_2$, InO, $In_2O$, $In_2O_3$, GeO, PbO, $WO_3$, $TiO_2$, SiO, $SiO_2$, $ZrO_2$, $Al_2O_3$ and a mixture thereof.

10. The method for recording optical information according to claim 1 wherein the proportion of the metal compound on the surface of the recording layer on the side to be irradiated with a light beam is at least 30 vol %.

11. The method for recording optical information according to claim 1 wherein the proportion of the metal on the surface of the recording layer opposite to the side to be irradiated with a light beam is at least 70 vol %.

12. The method for recording light information according to claim 1 wherein the recording layer comprises a part having a composition exhibiting a reflectance to light of at least 50%.

13. The method for recording optical information according to claim 12 wherein irradiation is continued until the composition exhibiting a reflectance to light of at least 50% is exposed.

14. The method for recording optical information according to claim 1 wherein the difference in reflectance to light between the non-irradiated area and the irradiated area of the recording layer is at least 20%.

15. The method for recording optical information according to claim 1 wherein the metal compound is the sole component in the section of the recording layer which covers the thickness of 0–500 Å from the surface to be irradiated.

16. The method for recording optical information according to claim 1 wherein the film thickness of the recording layer is 300–2,000 Å.

17. The method for recording optical information according to claim 1 wherein the surface of the recording layer where the proportion of the metal compound is greater is in contact with the support and the support is transparent.

18. The method for recording optical information according to claim 1 wherein the surface of the recording layer where the proportion of the metal compound is smaller is in contact with a support and the support is transparent.

19. A method for recording information by irradiating an optical information recording material, as claimed in claim 1, wherein the surface of the recording layer where the proportion of the metal compound is smaller is in contact with the support and wherein the support is opaque.

20. The method for recording optical information according to claim 1 wherein a protective layer is provided on the recording layer.

21. The method for recording optical information according to claim 1 wherein the metal is the sole component in the section of the recording layer which covers the thickness of 0–900 Å from the surface opposite to the side to be irradiated.

22. The method for recording optical information according to claim 1 wherein the proportion of the metal compound on the surface of the recording layer on the side to be irradiated with a light beam is at least 30 vol. % and wherein the proportion of the metal on the surface of the recording layer opposite to the side to be irradiated with a light beam is at least 70 vol. %.

23. The method for recording optical information according to claim 22 wherein the recording layer comprises a part having a composition exhibiting a reflectance to light of at least 50%, wherein irradiation is continued until the composition exhibiting a reflectance to light of at least 50% is exposed and wherein the difference in reflectance to light between the non-irradiated area and the irradiated area of the recording layer is at least 20%.

* * * * *